United States Patent [19]

Inokuchi

[11] Patent Number: 4,678,321
[45] Date of Patent: Jul. 7, 1987

[54] ANAMORPHIC FOCUSING SYSTEM

[75] Inventor: Toshiyuki Inokuchi, Kanagawa, Japan

[73] Assignee: Ricoh Company, Ltd., Tokyo, Japan

[21] Appl. No.: 823,788

[22] Filed: Jan. 29, 1986

[30] Foreign Application Priority Data

Feb. 1, 1985 [JP] Japan .................. 60-018404

[51] Int. Cl.[4] ............................. G03B 27/68
[52] U.S. Cl. ............................. 355/52; 355/8; 355/57; 350/420
[58] Field of Search ............... 355/52, 8, 57; 350/420

[56] References Cited

U.S. PATENT DOCUMENTS

| 2,832,262 | 4/1958 | Cook | 350/420 |
| 4,084,895 | 4/1978 | Ogawa et al. | 355/8 |
| 4,092,065 | 5/1978 | Tsuda et al. | 355/8 |
| 4,116,561 | 9/1978 | Knechtel et al. | 355/57 |
| 4,298,271 | 11/1981 | Sugiura et al. | 355/52 |
| 4,536,084 | 8/1985 | Tokuhara | 355/57 |

FOREIGN PATENT DOCUMENTS 57-37326  1/1982  Japan .

Primary Examiner—Monroe H. Hayes
Attorney, Agent, or Firm—Oblon, Fisher, Spivak, McClelland & Maier

[57] ABSTRACT

An anamorphic focusing system includes a focusing device including a roof-mirror-lens array for focusing an image of an object, and a cylindrical lens disposed in an optical path extending from the focusing device toward the image for magnifying the image in a direction perpendicularly to the longitudinal direction of the roof-mirror-lens array.

6 Claims, 22 Drawing Figures

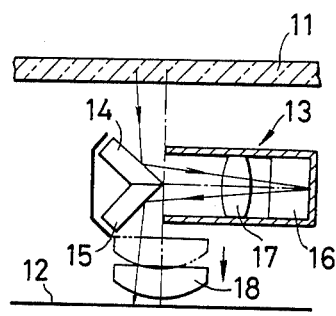
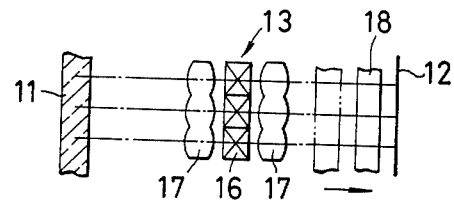
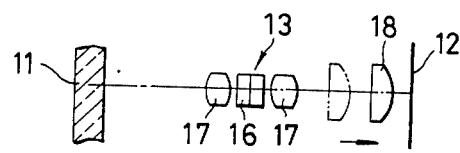
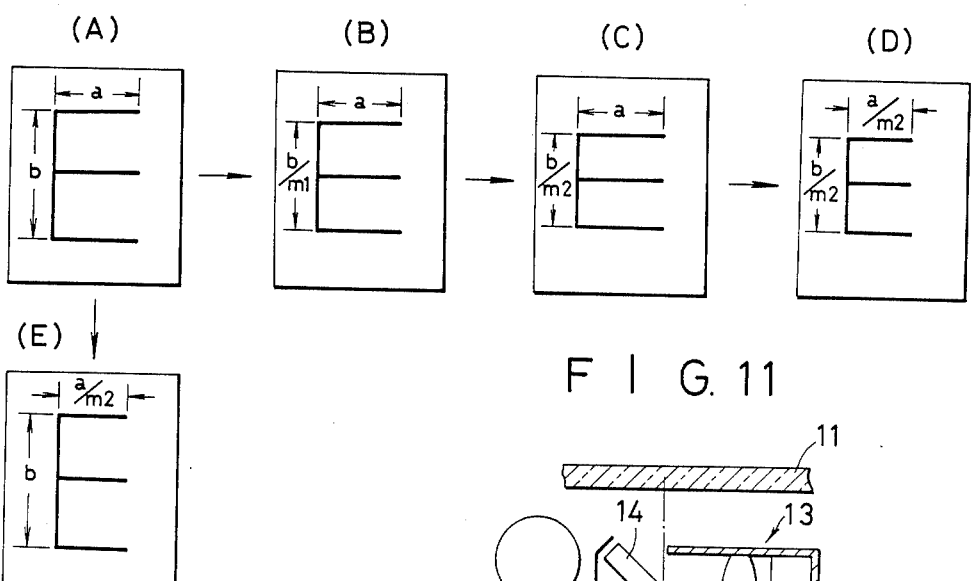
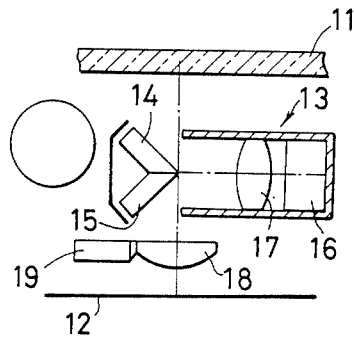

ANAMORPHIC FOCUSING SYSTEM

BACKGROUND OF THE INVENTION

The present invention relates to an anamorphic focusing system for focusing an image magnified only in one direction.

The sizes of documents to be copied by copying machines used in Japan are mostly classified into A sizes such as A4, A5, and B sizes such as B4, B5. In the United States, there are also letter sizes and legal sizes which the user wants to copy on copying machines. If a legal-size original document is to be copied on an A4-size sheet, a copying machine requires an anamorphic focusing system for reducing the size of the document image only in its longitudinal direction.

The exposure opitical systems in certain copying machines employ such an anamorphic focusing system for magnifying images only in one direction and focusing them. Conventional anamorphic focusing systems use a traditional copying lens combined with a converter lens in the form of a cylindrical lens having different magnifying powers in longitudinal and transverse directions, so that a document image can be focused with its size reduced only in the longitudinal direction.

Where the cylindrical lens is added as the converter lens to the typical copying lens, however, it is difficult to make a peripheral image portion at a large angle of view equal in quality to an image portion in the vicinity of the optical axis of the lens system, i.e., the peripheral image portion tends to be poorer in image quality. The cylindrical lens is costly to manufacture since it has cylindrical surfaces with their centers along a longitudinal lens axis and an axis normal thereto for providing magnifying powers in the longitudinal and transverse directions. The prior anamorphic focusing system is also disadvantageous in that it is large in size because the optical path is long between an object and a focused position which are in conjugate relationship with respect to the lens system.

Small-size copying machines employing a rod-lens array have recently been put to use to meet demands for smaller sizes of copying machines. However, such copying machines with a rod-lens array are limited in use to copying of documents with no size magnification or equal-size duplication.

SUMMARY OF THE INVENTION

It is an object of the present invention to provide an anamorphic focusing system which employs a roof-mirror lens array that is one of equal-size duplication optical devices and which can produce copied images that are good in quality up to their peripheral image portions, is inexpensive to manufacture, and compact in structure.

According to the present invention, there is provided an anamorphic focusing system including a focusing device including a roof-mirror-lens array for focusing an image of an object, and a cylindrical lens disposed in an optical path extending from the focusing device toward the image for magnifying the image in a direction perpendicularly to the longitudinal direction of the roof-mirror-lens array.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a sectional side elevational view of anamorphic focusing system according to another embodiment of the present invention;

FIG. 8 is a plan view of an optical system, shown on an equivalent basis, of the anamorphic focusing system of FIG. 7;

FIG. 9 is a side elevational view of the optical system illustrated in FIG. 8;

FIGS. 10(A) through 10(E) are front elvational views showing various images produced by the anamorphic focusing system of the present invention;

FIG. 11 is a sectional side elevational view of anamorphic focusing system according to still another embodiment of the present invention;

DESCRIPTION OF THE PREFERRED EMBODIMENTS

The principles of the present invention are particularly useful when embodied in an anamorphic focusing optical system for use in a copying machine, especially an electrophotographic copying machine.

Figure 1:
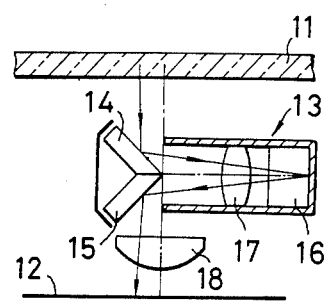
FIG. 1 is a sectional side elevational view of anamorphic focusing system according to an embodiment of the present invention.
Figure 2:
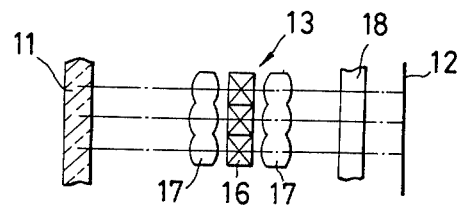
FIG. 2 is a plan view of an optical system, shown on an equivalent basis, of the anamorphic focusing system of FIG. 1.
Figure 3:
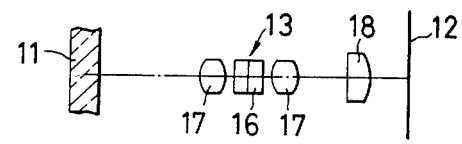
FIG. 3 is a side elevational view of the optical system illustrated in FIG. 2.

As shown in FIGS. 1 through 3, a copying machine has a plate 11 of contact glass for supporting a document (not shown) to be copied, and a focusing surface 12 provided by the circumferential surface of a photosensitive drum of the copying machine. Between the contact glass plate 11 and the focusing surface 12, there are disposed a focusing device 13, a plane mirror 14 for guiding light from the document on the contact glass plate 11 toward the focusing device 13, and a plane mirror 15 for guiding light from the focusing device 13 toward the focusing surface 12. The two plane mirrors 14, 15 are integrally formed with each other such that they extend substantially at a right angle to each other. The focusing device 13 comprises a roof-mirror-lens array composed of a roof-mirror array 16 having a succession of aligned plane roof-mirrors and a lens array 17 disposed in front of the roof-mirror array 16. The individual lenses of the lens array 17 are positioned in confronting relation to respective pairs of roof-shaped reflecting surfaces of the roof-mirror array 16. The roof-mirror-lens array of the focusing device 13 is known from Japanese Laid-Open Patent Publication No. 57(1982)-37326, for example.

The document to be copied which is placed on the contact glass plate 11 is exposed by an illuminating device (not shown) to slit light in a direction perpendicular to the sheet of FIG. 1. The illuminating slit light moves in a direction parallel to the sheet of FIG. 1. The focusing device 13 and the plane mirrors 14, 15 also move in unison in synchronism with the movement of the illuminating slit light. The roof-shaped reflecting surfaces of the roof-mirror array 16 and the lenses of the lens array 17 are arrayed in the direction along the illuminating slit light, i.e., normal to the sheet of FIG. 1. The plane mirrors 14, 15 are elongate along the roof-mirror array 16 and the lens array 17.

A cylindrical lens 18 is disposed in an optical path from the focusing device 13 to the focusing surface 12, more specifically, in an optical path in which light from the focusing device 13 is reflected by the plane mirror 15 toward the focusing surface 12. The cylinderical lens 18 has a cylindrical surface with its central line or axis extending along the longitudinal direction of the roof-mirror array 16. Therefore, the cylindridal lens 18 magnifies the document image in a direction normal to the longitudinal direction of the roof-mirror array 16. The cylindrical lens 18 is movable in unison with the focusing device 13, the cylindrical surface thereof being convex.

In operation, when the document on the contact glass plate 11 is illuminated with light, the reflected light from the document is reflected by the plane mirror 14 to pass through the lens array 17, and then reflected back by the roof-mirror array 16 to pass through the lens array 17 again. Thereafter, the light having passed through the lens array 17 is reflected by the plane mirror 15 toward the focusing surface 12 on which the image of the document is focused by the lens array 17. FIGS. 2 and 3 illustrate the focusing optical system on an equivalent basis. The focused image on the focusing surface 12 is magnified in the direction perpendicular to the longitudinal direction of the lens array 16, i.e., in the direction in which the illuminating slit light moves. Actually, the focused image is reduced in size in that direction since the cylindrical surface of the cylindrical lens 18 is convex. Thereby the image of a legal-size document can be copied on an A4-size sheet at a uniformly reduced dimension by exposing the legal-size document to the illuminating slit light as it moves longitudinally of the document.

Figure 4:
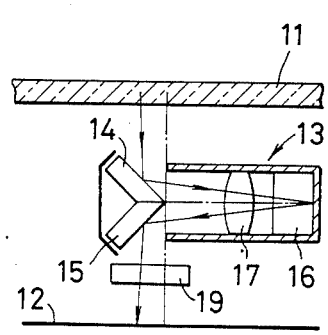
FIG. 4 is a sectional side elevational view of a modification of the anamorphic focusing system of FIG. 1, with a different optical arrangement employed.
Figure 5:
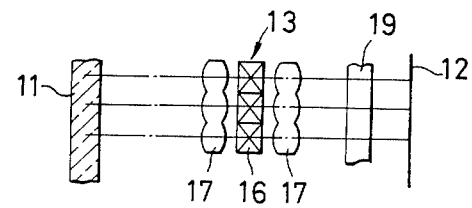
FIG. 5 is a plan view of the optical arrangement, shown equivalently, of FIG. 4.
Figure 6:
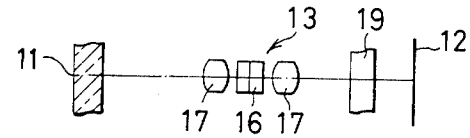
FIG. 6 is a side elevational view of the optical arrangement shown in FIG. 5.

The cylindrical lens 18 may be used as a converter lens movable into and out of the optical path between the plane mirror 15 and the focusing surface 12. When a document is to be copied to an unmagnified size, i.e., in an equal-size duplication mode, the cylindrical lens 18 is retracted out of the optical path. At this time, a transparent plate 19 is placed in the optical path as shown in FIGS. 4 through 6. The transparent plate 19 is used for the following reason: When the cylindrical lens 18 is positioned in the optical path, it has a magnifying power in the direction normal to the longitudinal direction of the roof-mirror array 16, whereas it is equivalent to a transparent plate in the longitudinal direction of the roof-mirror array 16. The focusing optical system is designed with the above fact taken into consideration. In the equal-size duplication mode in which the cylindrical lens 18 is not used, the transparent plate 19 is inserted in place of the cylindrical lens 18 to make up for a shortage of the length of the optical path. The image of the document is transmitted through the contact glass plate 11, the transparent plate 19 and the contact glass plate 11 being symmetrically positioned with respect to the focusing device 13. Since the image formed by the optical system having the arrayed elements with the symmetrical optical devices is stabilized, the image quality is not lowered by the presence of the transparent plate 19.

As shown in FIGS. 7 through 9, the cylindrical lens 18 may be movable in and along the optical path to vary the magnification ratio while keeping the conjugate length unchanged. This arrangement is made possible by relying on the fact that the roof-mirror-lens array is better in MTF (Modulation Transfer Function) and focal depth in the direction normal to the longitudinal direction thereof than in the longitudinal direction thereof.

Figures 12, 13:
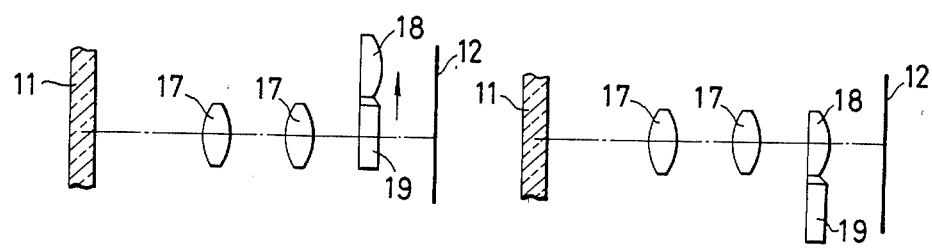
FIG. 12 is a side elevational view of an optical system, shown equivalently, including a cylindrical lens in the anamorphic focusing system shown in FIG. 11.
FIG. 13 is a side elevational view of the optical system of FIG. 12, with the cylindrical lens in a different position.
Figure 14:
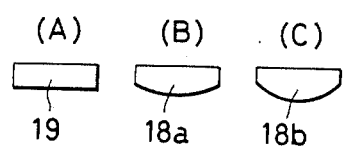
FIG. 14 is a side elevational view of cylindrical lenses and a transparent plate that can be used in the present invention.

The cylindrical lens 18 and the transparent plate 19 may be exchanged by retaining them as optional parts outside of the system and replacing them with each other. Alternatively, as shown in FIGS. 11 through 13, the cylindrical lens 18 and the transparent plate 19 may be joined end to end, and can be replaced with each other by shifting them transversely across the optical path. The cylindrical lens 18 and the transparent plate 19 shown in FIGS. 11 through 13 may be produced separately and held together by a holder, or may be integrally formed with each other. The integral formation of the cylindrical lens 18 and the transparent plate 19 is better in positional accuracy and lower in cost.

Where the cylindrical lens and the transparent plate are to be provided as optional parts outside of the system, one transparent plate 19, one cylindrical lens 18a, and one cylindrical lens 18b having a different curvature from that of the cylindrical lens 18a may be used as optional parts as shown in FIGS. 14(A) through 14(C). The two cylindrical lenses 18a, 18b are selectively used for selecting one of different magnification ratios.

Figure 15:
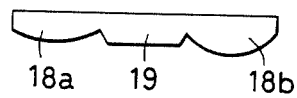
FIG. 15 is a side elevational view of other cylindrical lenses and another transparent plate that can be used in the present invention.

In case the cylindrical lens and the transparent plate are to be replaced with each other by shifting them transversely across the optical path, an integral structure shown in FIG. 15 may be used which comprises one transparent plate 19, one cylindrical lens 18a, and one cylindrical lens 18b having a different curvature from that of the cylindrical lens 18a, the transparent plate 19 and the cylindrical lenses 18a, 19b being integrally joined end to end. This arrangement also allows different magnification ratios to be selected.

Figure 16:
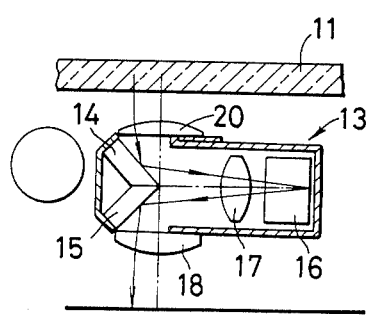
FIG. 16 is a sectional side elevational view of anamorphic focusing system according to a still further embodiment of the present invention.

FIG. 16 shows an arrangement in which the cylidrical lens 18 is disposed in the optical path between the focusing device 13 and the focusing surface 12 and another cylindrical lens 20 is disposed in the optical path between the focusing device 13 and the contact glass plate 11.

Figure 17:
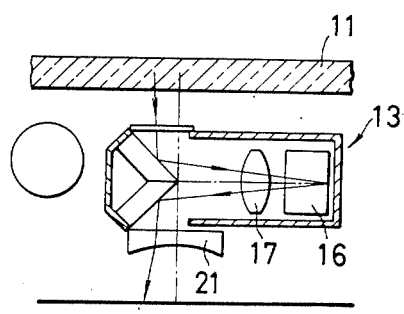
FIG. 17 is a sectional side elevational view of anamorphic focusing system according to a yet still further embodiment of the present invention.

FIG. 17 illustrates an anamorphic focusing system including another cylindrical lens 21 disposed in the optical path between the focusing device 13 and the focusing surface 12 and having a concave cylindrical surface for enlarging a document image. This cylindrical lens 21 may be replaced with a transparent plate (not shown) in the same manners as described above.

Figure 18:
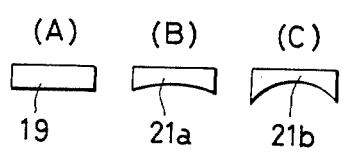
FIG. 18 is a side elevational view of other cylindrical lenses and another transparent plate that can be used in the present invention.

FIGS. 18(A) through 18(C) show one transparent plate 19 and two cylindrical lenses 21a, 21b having concave cylindrical surfaces of different curvatures for enlarging a document image. The transparent plate 19 and the cylindrical lenses 21a, 21b are provided separately as optional parts which can selectively be inserted in place from outside the system. These transparent plate 19 and cylindrical lenses 21a, 21b may be integrally formed end to end for selective replacement in the transverse direction across the optical path.

A cylindrical lens for reducing a document image and a cylindrical lens for enlarging a document image may be provided and selectively used to meet a particular demand.

In each of the aforesaid embodiments, fixed or variable magnification in one of the longitudinal and transverse directions of a document to be copied is available in a practically required magnification range. A legal-size document can therefore be copied on an A4-size sheet.

By using a copy that has been magnified in one direction as described above as a document to be copied which is turned 90 degrees, and exposing the same to illuminating slit light again, a copied image can be obtained which is magnified in both longitudinal and transverse directions. FIG. 10 shows various copies produced by reduction. FIG. 10(A) shows an image serving as an original document. FIG. 10(B) illutrates a copied image which is reduced in longitudinal size. FIG. 10(C) shows another copied image which is produced by reducing the image size of FIG. 10(B) in its longitudinal direction. FIG. 10(D) shows a third-generation copy which is reduced transversely at the same magnification ratio as that at which the image of FIG. 10(C) is reduced in size from the image of FIG. 10(B). FIG. 10(E) illustrates a copy which is produced by reducing the transverse size of the original document shown in FIG. 10(A).

While the foregoing embodiments are illustrated as being incorporated in the exposure optical system in a copying machine, the focusing system of the present invention is also applicable to the optical systems in various optical instruments.

According to the present invention, an anamorphic focusing optical system which is composed of a roof-mirror-lens array and a cylindrical lens or cylindrical lenses is capable of producing images of better image quality at a peripheral image portion than those produced by conventional anamorphic focusing systems which comprise a typical lens system and a cylindrical lens. Since each of the lenses of the roof-mirror-lens array is of a small angle of view, the anamorphic cylindrical lens or lenses used need to have a cylindrical surface only in one direction and hence are inexpensive. The anamorphic focusing system of the invention can be made compact because of the short conjugate length, and is capable of variable magnification inasmuch as the focal length in the direction normal to the longitudinal direction of the roof-mirror-lens array is large.

Although certain preferred embodiments have been shown and described, it should be understood that many changes and modifications may be made therein without departing from the scope of the appended claims.

I claim:

1. An anamorphic focusing system comprising:
   a focusing device including a roof-mirror-lens array for focusing an image of an object;
   a cylindrical lens disposed in an optical path extending from said focusing device toward the image for magnifying the image in a direction perpendicular to the longitudinal direction of said roof-mirror-lens array; and
   a transparent plate for compensating the length of the optical path;
   wherein said cylindrical lens is movable into and out of said optical path and said transparent plate is movable into said optical path when said cylindrical lens is moved out of said optical path.

2. An anamorphic focusing system according to claim 1, wherein said cylindrical lens and said transparent plate are joined end to end.

3. An anamorphic focusing system according to claim 2, wherein said cylindrical lens and said transparent plate are integrally formed with each other.

4. An anamorphic focusing system according to claim 2, wherein said cylindrical lens and said transparent plate are produced separately and held together by a holder.

5. An anamorphic focusing system according to claim 1, wherein said cylindrical lens is movable in and along said optical axis for variable magnification.

6. An anamorphic focusing system according to claim 1, further comprising another cylindrical lens disposed in an optical path extending from said focusing device toward said object for magnifying the image in the direction perpendicularly to the longitudinal direction of said roof-mirror-lens array.

* * * * *